United States Patent Office 2,699,386
Patented Jan. 11, 1955

2,699,386

COLORED FOG AND PROCESS OF FORMING SAME

Saul R. Buc, Easton, Pa., assignor to General Aniline & Film Corporation, New York, N. Y., a corporation of Delaware No Drawing. Application December 20, 1950, Serial No. 201,877

6 Claims. (Cl. 52—23)

The present invention relates to colored fog for signalling and other purposes.

Colored smokes are used by the armed forces for signalling and may also have application for advertising display purposes. These may include dyes or pigments suspended in the smoke.

Applicant has discovered a new colored fog and a method for producing it. The composition is a dyestuff suspended in a solvent for the dyestuff in the form of a fog. This is preferably prepared by spraying two separate liquid intermediates in the air which combine to form a dye.

The following examples illustrate preferred embodiments of the invention, but it will be understood that variations and modifications may be made within the scope of the claims.

Example 1

A 10% alcoholic solution of furfural is forced through a fine orifice to form a mist or fog. A 10% alcoholic solution of aniline plus aniline hydrochloride in equivalent parts is likewise forced through a jet to form a fog or mist which is directed into the body of fog or mist containing furfural. The reaction takes place almost instantaneously forming a pink color in the mixed fogs. The reaction may be represented as follows:

$$\text{Ph-NH}_2 + \text{Ph-NH}_3^+\text{Cl}^- + \text{furfural-CHO} \longrightarrow$$

$$\text{Ph-NH}=CH-CH=CH-\underset{|}{\overset{OH}{C}}=CH-NH-Ph \quad \text{Cl}^-$$

In concentrated form this dyestuff is a deep red compound the nomenclature of which is N,N'-diphenyl-5-amino-4-hydroxy pentadien-2,4-aldimine hydrochloride.

Alternatively, the furfural need not be in alcoholic solution. The aniline and aniline-hydrochloride may be in solution in any solvent, therefore including the lower alcohols (methyl, ethyl, propyl), glycol, glycol ether, etc.

Example 2

A 10% solution in water of diazotized 1-amino-2-naphthol-4-sulfonic acid was forced through an orifice to form a fog. A 10% solution in water of phenol adjusted to a pH of 10 with sodium carbonate was forced through an orifice to form a fog and caused to mix with the fog containing the amine. Almost immediately there was formed a light blue fog. The dye formed in this reaction has the following formula:

(structure: naphthalene with N=N—phenyl—OH, OH, and $SO_3H$ substituents)

In a similar manner other diazotizable amines may be coupled with various couplers which give a fast reaction. For example, a nitro derivative of the diazotized amine of Example 2 may be used, having a formula:

(structure: naphthalene with $NH_2$, OH, $NO_2$, and $SO_3H$ substituents)

These diazo compounds may be coupled with phenols, resorcinol, phloroglucinol, alpha naphthol, beta naphthol, 2-naphthol-3-carboxylic amides, pyrazolones, etc.

It will be understood that the fogs will be mixed as by directing jets of fog so as to come together and form one large body of fog. Besides the means suggested in the examples other means for forming fog may be used. For example, one or both of the dye components may be prepared in an aerosol bomb. The dyestuff in this case may be dissolved in the fog forming a low boiling liquid or may be dissolved in a solvent for the dye such as alcohol and water and then mixed with the low boiling liquid. Examples of low boiling liquids used in the preparation of aerosol bombs include methylchloride, ethylchloride, dichlor difluor methane, dichlor fluormethane, trichlor fluormethane, dichlor tetrafluorethane.

It will be further understood that the reaction of Example 1 may be carried out with other simple aromatic amines plus their hydrochloride. Thus, in place of aniline may be used toluidine, naphthylamine, biphenylamine, etc.

I claim:

1. A colored fog comprising a finely divided suspension in air of liquid droplets of a solution in a solvent of the compound:

$$\text{Ph-NH}=CH-CH=CH-\underset{|}{\overset{OH}{C}}=CH-NH-Ph \quad \text{Cl}^-$$

2. A method for producing a colored fog comprising contacting in the atmosphere a suspension in air of liquid droplets of a color forming reagent in liquid form selected from the class consisting of diazotized 1-amino-2-naphthol-4-sulfonic acid and a mono nitrated derivative thereof and a second suspension in air of liquid droplets of a color coupler compound selected from the class consisting of phenols, naphthols and pyrazolones.

3. A method for producing a colored fog comprising contacting in the atmosphere a suspension in air of liquid droplets of furfural and a second suspension in air of liquid droplets of an alcoholic solution of an equal part mixture of a primary carbocyclic aryl amine and the hydrochloride of said aryl amine, said mixture and furfural being capable of forming in situ a colored fog.

4. A process for producing a colored fog comprising contacting in the atmosphere a fog produced by injecting an alcoholic solution of furfural through a small orifice and a fog produced by injecting through a small orifice an alcoholic solution of a mixture of aniline and aniline hydrochloride.

5. A method for producing a colored fog comprising releasing from an aerosol bomb a suspension in air of liquid droplets of a color forming reagent selected from the class consisting of furfural, diazotized 1-amino-2-naphthol-4-sulfonic acid and the mono nitrated derivative thereof, and contacting therewith liquid droplets released from another aerosol bomb containing an equal part mixture of a primary aryl amine and the hydrochloride of said aryl amine dissolved in an alcoholic solvent, and liquid droplets selected from the group of phenols, naphthols, and pyrazolones, said furfural and mixture of aryl amine and aryl amine hydrochloride and said diazotized primary aromatic amine and one of the group of phenols, naphthols, and pyrazolones, being capable of forming in situ a colored dye.

6. A colored fog comprising a solid-in-gas suspension consisting of a nascent colored solid selected from a class consisting of N,N'-diaryl-5-amino-4-hydroxy pentadien- 2,4-aldimine hydrochlorides and mono azo dyes having the following structural formula
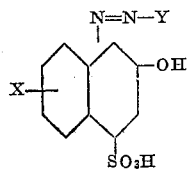
wherein X is a member selected from the group consisting of H and —NO₂ and Y is a member of the group consisting of phenols, naphthols and pyrazolones.
References Cited in the file of this patent
UNITED STATES PATENTS
1,624,600   Hitt _____ Apr. 12, 1927
FOREIGN PATENTS
231,826   Great Britain _____ July 23, 1925